(12) United States Patent
Chen et al.

(10) Patent No.: US 12,218,913 B2
(45) Date of Patent: Feb. 4, 2025

(54) SYSTEM AND METHOD FOR SECURING PROTECTED HOST

(71) Applicant: TrustONE Security Inc., Taipei (TW)

(72) Inventors: Ting Huang Chen, Keelung (TW); Po Shao Wu, New Taipei (TW)

(73) Assignee: TRUSTONE SECURITY INC., Taipei (TW)

( * ) Notice: Subject to any disclaimer, the term of this patent is extended or adjusted under 35 U.S.C. 154(b) by 212 days.

(21) Appl. No.: 18/151,759

(22) Filed: Jan. 9, 2023

(65) Prior Publication Data

US 2023/0224276 A1 Jul. 13, 2023

(30) Foreign Application Priority Data

Jan. 10, 2022 (TW) ................................. 111100998

(51) Int. Cl.
H04L 9/40 (2022.01)

(52) U.S. Cl.
CPC ...... H04L 63/0263 (2013.01); H04L 63/0236 (2013.01); H04L 63/0435 (2013.01); H04L 63/0823 (2013.01)

(58) Field of Classification Search
CPC ............ H04L 63/0263; H04L 63/0236; H04L 63/0435; H04L 63/0823; H04L 63/0272; H04L 63/0281; H04L 63/0428
See application file for complete search history.

(56) References Cited

U.S. PATENT DOCUMENTS

| | | | | |
|---|---|---|---|---|
| 9,893,897 | B2 * | 2/2018 | Li ....................... | H04L 63/0428 |
| 2017/0374032 | A1 * | 12/2017 | Woolward .......... | H04L 63/0263 |
| 2021/0099468 | A1 * | 4/2021 | Cabe ..................... | G06F 21/53 |
| 2021/0160219 | A1 * | 5/2021 | Goldschlag ......... | H04L 41/0894 |

* cited by examiner

*Primary Examiner* — Joseph P Hirl
*Assistant Examiner* — Thomas A Gyorfi
(74) *Attorney, Agent, or Firm* — Muncy, Geissler, Olds & Lowe, P.C.

(57) ABSTRACT

A system and a method are for securing a protected host. A secure channel server receives a plurality of first packets transmitted over a first network, and analyzes the plurality of first packets to obtain an analysis information. The plurality of first packets include a plurality of encrypted second packets encrypted by a terminal data processing apparatus with a certificate issued by the secure channel server. The plurality of encrypted second packets relate to an application process executed by the terminal data processing apparatus and judged as a secure process. The plurality of first packets are selectively decrypted with the certificate according to the analysis information into a plurality of decrypted first packets. The secure channel server redirects, according to a selected redirection rule, the decrypted first packets or the first packets selectively via a second network to the protected host.

10 Claims, 6 Drawing Sheets

SYSTEM AND METHOD FOR SECURING PROTECTED HOST

CROSS-REFERENCE TO RELATED APPLICATION

This utility application claims priority to Taiwan Application Serial Number 111100998, filed Jan. 10, 2022, which is incorporated herein by reference.

BACKGROUND OF THE INVENTION

1. Field of the Invention

The invention relates to a system and a method for securing a protected host, and more in particular, to a system and a method for securing a protected host by using a secure channel server to prevent the Internet protocol (Internet Protocol, IP) address of the protected host from being exposed and further by using a honeypot.

2. Description of the Prior Art

With the continuous advancement of network technology, there are more and more cyber-attacks on the Internet. Attackers can attack important hosts by invading some terminal data processing apparatuses. However, most of the network IP addresses of important hosts are exposed on the Internet at present. As long as attackers invade some terminal data processing apparatuses and scan the linked network, they may obtain the IP addresses of important hosts and attack them.

In addition, in order to protect important hosts, there are usually some defense measures formulated for attack ways, so as to prevent attacks from attackers. In order to obtain more attack ways of attackers, most of the prior arts use honeypots.

A honeypot is a network architecture system that traps hackers or malicious programs in the field of information security. Regarding the honeypot, it is mainly to set up a fake host to simulate the real host, and to lure hackers to invade the fake host, so as to detect the source of hackers, and further to take actions to block hacker attacks.

The administrator usually needs to operate the official host. In order to avoid hacker attacks, a honeypot is set up. When hackers invade, since they don't know which one is the official host, they will try to log in from both of the official host and the honeypot. When a hacker logs in to the honeypot, his whereabouts will be revealed. Because usually no one will log in to the honeypot, so the log-in must be a malicious intruder.

However, prior arts of employing honeypots have several disadvantages. Firstly, because the concept of using a fake host has already spread, hackers will be more careful. Since the honeypot is less likely to be logged in, there will be no network traffic. From the analysis of network traffic, it can be easily avoided. Secondly, even if some network traffic is simulated to the honeypot, the probability of the official host being attacked will vary depending on the number of honeypots. More honeypots are needed to reduce the probability.

SUMMARY OF THE INVENTION

Accordingly, one scope of the invention is to provide a system and a method for securing a protected host by using a secure channel server to prevent the IP address of the protected host from being exposed and further by using a honeypot. By the system and the method according to the invention, the protected host can not only be effectively protected, but also the IP address of the protected host is not exposed on the network. Moreover, there is no need to set up a large number of honeypots.

A system, according to a preferred embodiment of the invention, for securing a protected host includes a terminal data processing apparatus and a secure channel server. The terminal data processing apparatus includes a first communicating device and at least one first processor. The at least one first processor is electrically connected to the first communicating device, and functions in executing a first operating system. The first operating system includes an authentication module, a secure process launcher, a network filtering module, a secure process authenticating module, a first storage module, a packet encrypting module, a second storage module, and a first network driver. The secure process launcher is coupled to the authentication module. The network filtering module is coupled to the secure process launcher. The secure process authenticating module is coupled to the network filtering module. The first storage module is coupled to the secure process authenticating module, and therein stores a plurality of verification rules, a plurality of first characteristics and a plurality of first redirection rules. Each verification rule corresponds to at least one of the plurality of first characteristics. The packet encrypting module is coupled to the network filtering module. The second storage module is coupled to the packet encrypting module. The first network driver is respectively coupled to the network filtering module and the first communicating device. The secure channel server links to the terminal data processing apparatus via a first network. The secure channel server links to the protected host via a second network. The secure channel server includes a second communicating device and at least one second processor. The at least one second processor is electrically connected to the second communicating device, and functions in executing a second operating system. The second operating system includes a second network driver, a packet analyzing module, a certificate authenticating module, and a third storage module. The second network driver is coupled to the second communicating device. The packet analyzing module is coupled to the second network driver. The certificate authenticating module is coupled to the packet analyzing module, and issues a certificate. The certificate is previously stored in the second storage module. The third storage module is coupled to the packet analyzing module, and therein stores a plurality of second redirection rules. The authentication module receives and authenticates at least one authentication data. If an authentication result authenticated by the authentication module according to the at least one authentication data is positive, the secure process launcher is executed. When the secure process launcher is executed and the at least one first processor executes an application process to link to the secure channel server, the application process is coupled to the network filtering module. The network filtering module retrieves N second characteristics relative to the application process, where N is a natural number. The secure process authenticating module judges whether the application process is a secure process according to the plurality of verification rules, the plurality of first characteristics and the N second characteristics. If the judgment result of the secure process authenticating module is positive, the secure process authenticating module selects a selected first redirection rule corresponding to the application process from the plurality of first redirection rules, and the network packet encrypting module with the certificate encrypts a plurality of first packets relative to the application process into a plurality of encrypted first packets. The network filtering module, according to the selected first redirection rule, redirects the plurality of encrypted first packets to the second communicating device via the first network driver, the first communicating device and the first network. The packet analyzing module receives a plurality of second packets transmitted over the first network through the second communicating device and the second network driver. The packet analyzing module analyzes the plurality of second packets to obtain an analysis information, and the certificate authenticating module selectively with the certificate decrypts the plurality of second packets into a plurality of decrypted second packets according to the analysis information. The packet analyzing module selects a selected second redirection rule from the plurality of second redirection rules according to the analysis information. The packet analyzing module, according to the selected second redirection rule, selectively redirects the plurality of decrypted second packets or the plurality of second packets to the protected host via the second network driver, the second communicating device and the second network.

Further, the system, according to the preferred embodiment of the invention, for securing the protected host also includes a honeypot. The honeypot links to the secure channel server via a third network. The packet analyzing module, according to the selected second redirection rule, alternatively redirects the plurality of decrypted second packets or the plurality of second packets to the protected host via the second network driver, the second communicating device and the second network, or to the honeypot via the second network driver, the second communicating device and the third network.

In one embodiment, the first operating system has a first application layer and a first driver layer. The authentication module and the secure process launcher can reside in the first application layer of the first operating system. The network filtering module, the secure process authenticating module, the first storage module, the packet encrypting module, the second storage module, and the first network driver can reside in the first driver layer of the first operating system.

In one embodiment, the second operating system has a second application layer and a second driver layer. The packet analyzing module, the certificate authenticating module and the third storage module can reside in the second application layer of the second operating system. The second network driver can reside in the second driver layer of the second operating system.

A method, according to a preferred embodiment of the invention, is for securing a protected host. The implementation environment of the method according to the invention is that a terminal data processing apparatus links to a secure channel server via a first network. The secure channel server links to the protected host via a second network. The secure channel server issues a certificate. The certificate, a plurality of verification rules, a plurality of first characteristics and a plurality of first redirection rules are previously stored in the terminal data processing apparatus. A plurality of second redirection rules are previously stored in the secure channel server. The method according to the invention performs, at the terminal data processing apparatus, the steps of: receiving at least one authentication data; according to the at least one authentication data, performing an authentication; if the authentication result is positive, executing a secure process launcher; when the secure process launcher is executed and an application process is executed to link to the secure channel server, retrieving N second characteristics relative to the application process, where N is a natural number; according to the plurality of verification rules, the plurality of first characteristics and the N second characteristics, judging if the application process is a secure process; if the application process is judged as the secure process, encrypting, with the certificate, a plurality of first packets relative to the application process into a plurality of encrypted first packets; selecting a selected first redirection rule corresponding to the application process from the plurality of first redirection rules; and according to the selected first redirection rule, redirecting the plurality of encrypted first packets to the secure channel server via the first network. The method according to the invention performs, at the secure channel server, the steps of: receiving a plurality of second packets transmitted over the first network; analyzing the plurality of second packets to obtain an analysis information; according to the analysis information, selectively decrypting, with the certificate, the plurality of second packets into a plurality of decrypted second packets; according to the analysis information, selecting a selected second redirection rule from the plurality of second redirection rules; and according to the selected second redirection rule, selectively redirecting the plurality of decrypted second packets or the plurality of second packets to the protected host via the second network.

Further, the implementation environment of the method, according to the preferred embodiment of the invention, for securing the protected host also is that the secure channel server links to a honeypot via a third network. The method according to the invention finally performs, at the secure channel server, the step of: according to the selected second redirection rule, alternatively redirecting the plurality of decrypted second packets or the plurality of second packets to the protected host via the second network, or to the honeypot via the third network.

In one embodiment, each verification rule can include at least one characteristic item among an original file name, a signature, an issuer company, a product name, a parent process, a file size, a file version and sum check, or can also include other characteristic items.

In one embodiment, each first redirection rule can include a process type, a destination IP address, a destination port, a first redirection IP address, a first redirection port, an encryption type, and the like.

In one embodiment, each second redirection rule can include a packet encryption type, a source IP address, a receiving port, a second redirection IP address, a second redirection port, and the like.

Distinguishable from the prior art, by the system and the method according to the invention, the protected host can not only be effectively protected, but also the IP address of the protected host is not exposed on the network. Moreover, there is no need to set up a large number of honeypots.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
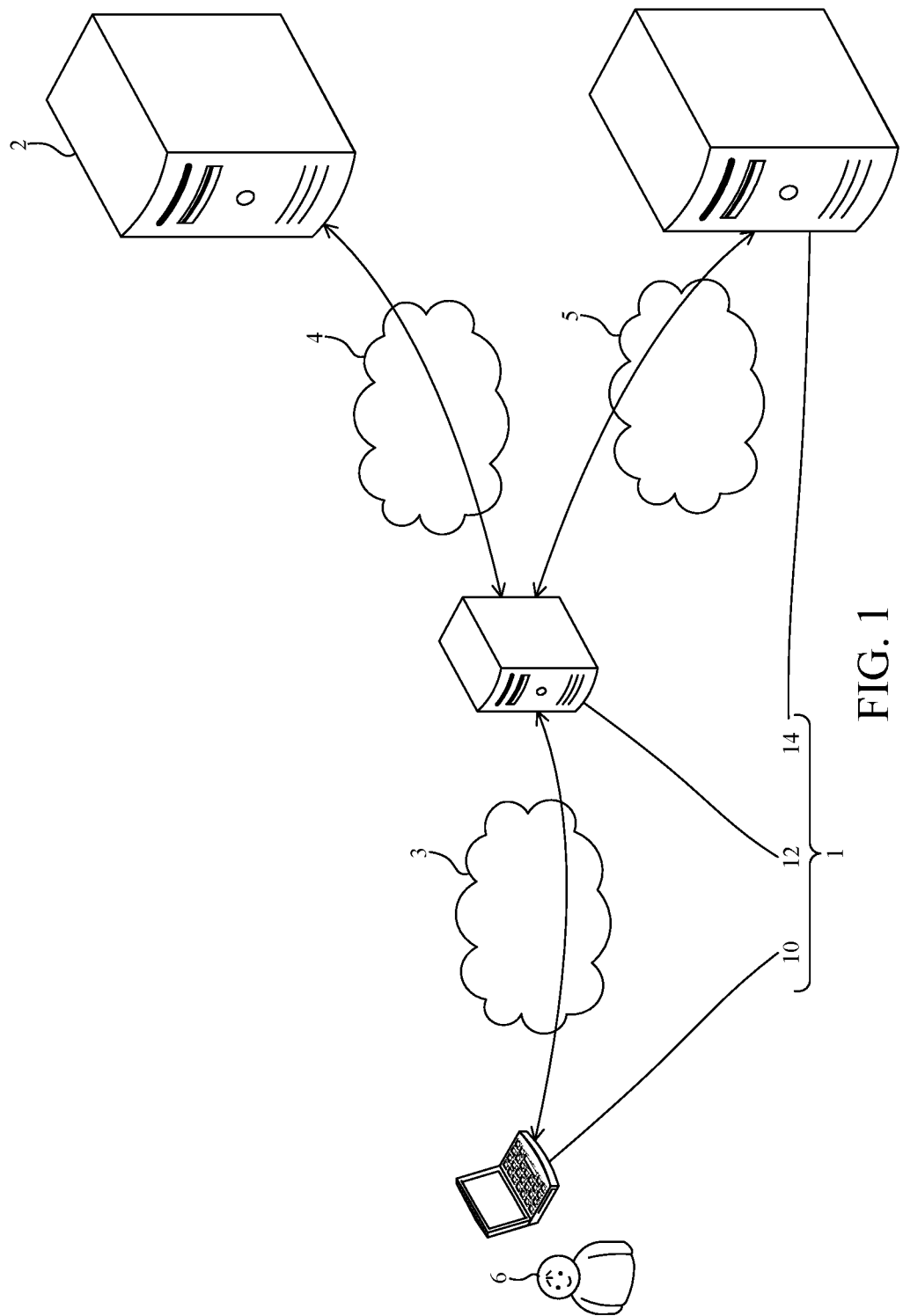
FIG. 1 is a schematic diagram of a system for securing a protected host and an implementation environment architecture of the system according to the preferred embodiment of the invention.
Figure 2:
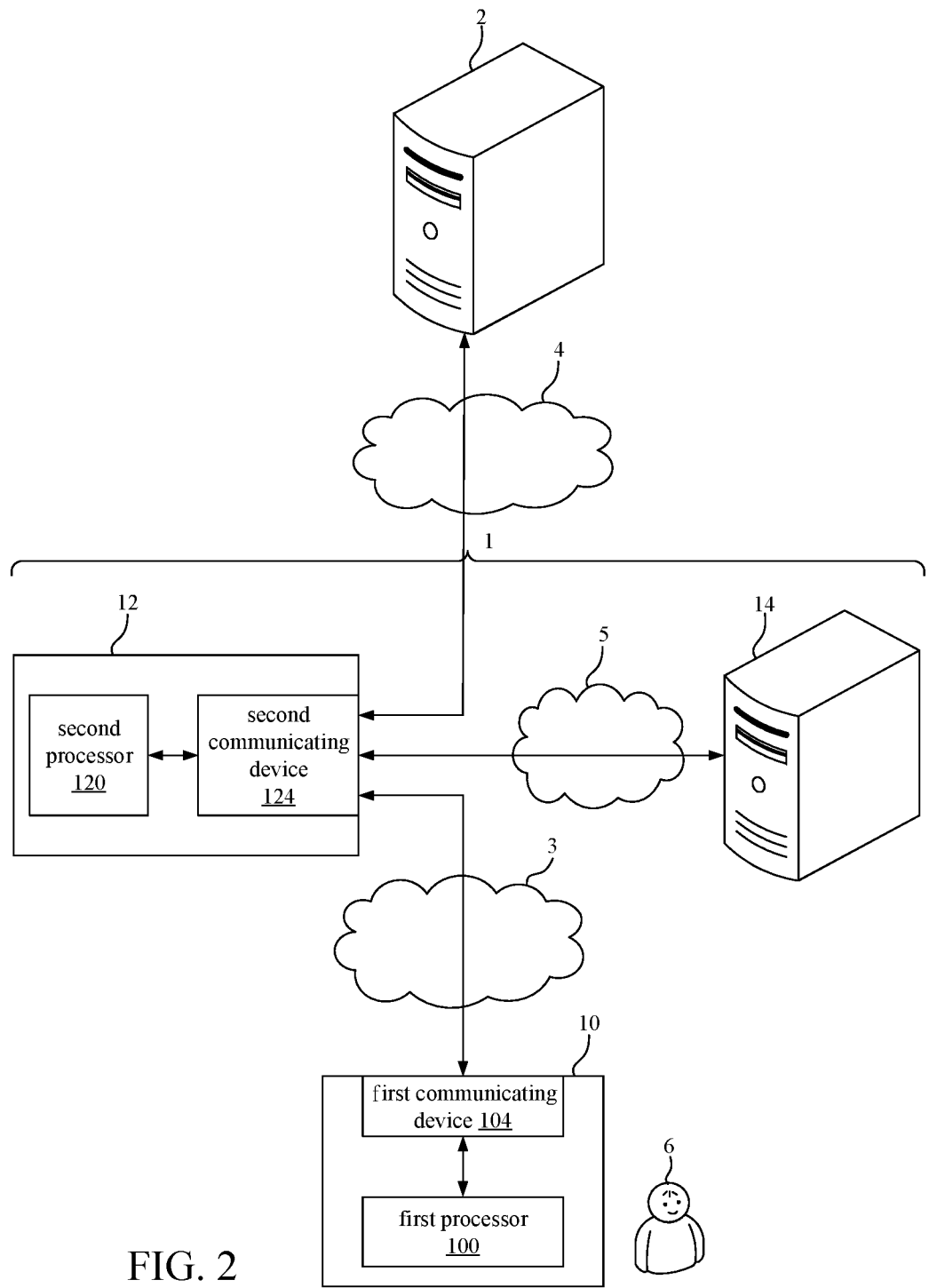
FIG. 2 is a functional block diagram of the system shown in FIG. 1.
Figure 3:
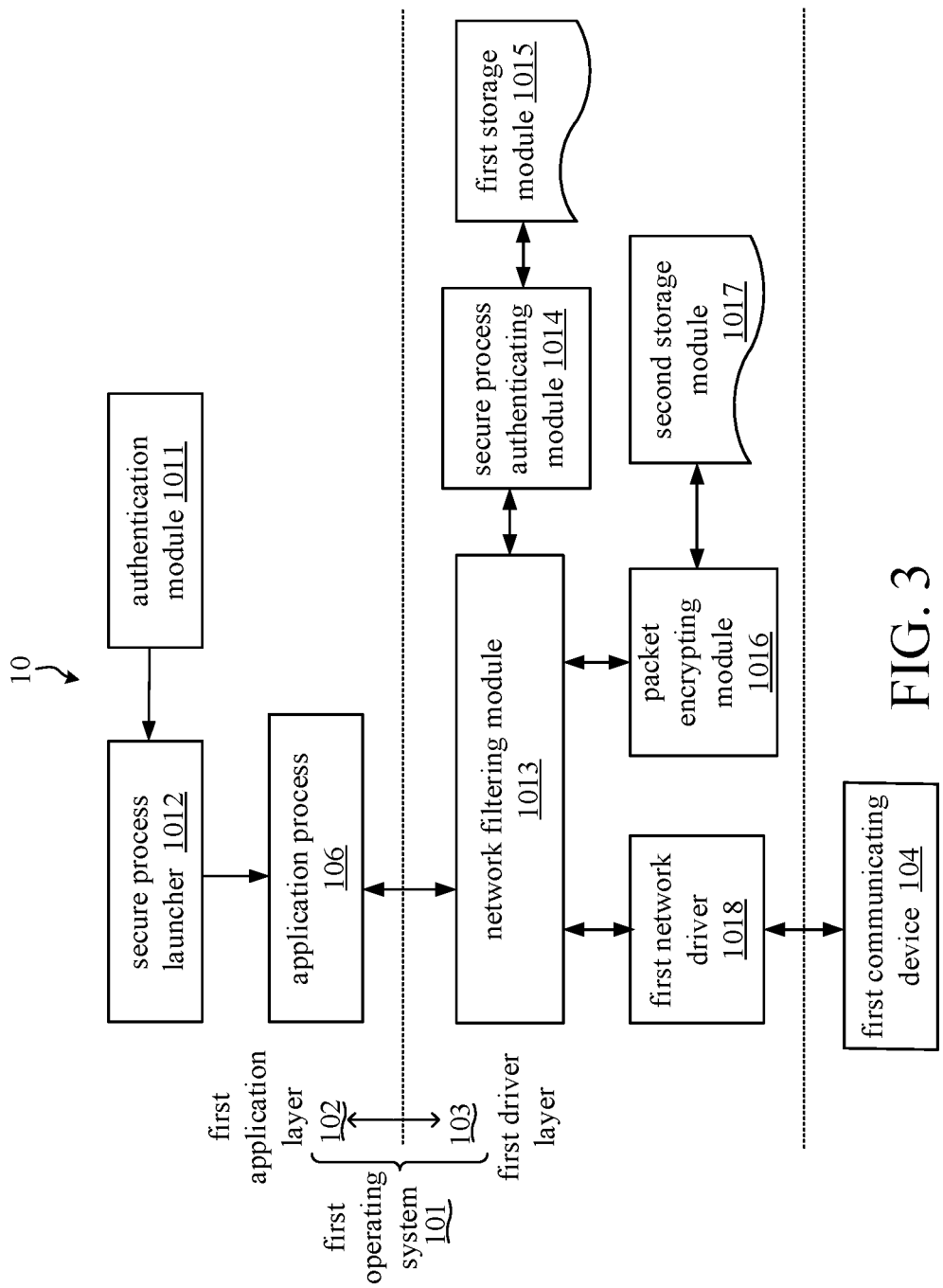
FIG. 3 is a schematic diagram of the architecture of a terminal data processing apparatus of the system according to the preferred embodiment of the invention.
Figure 4:
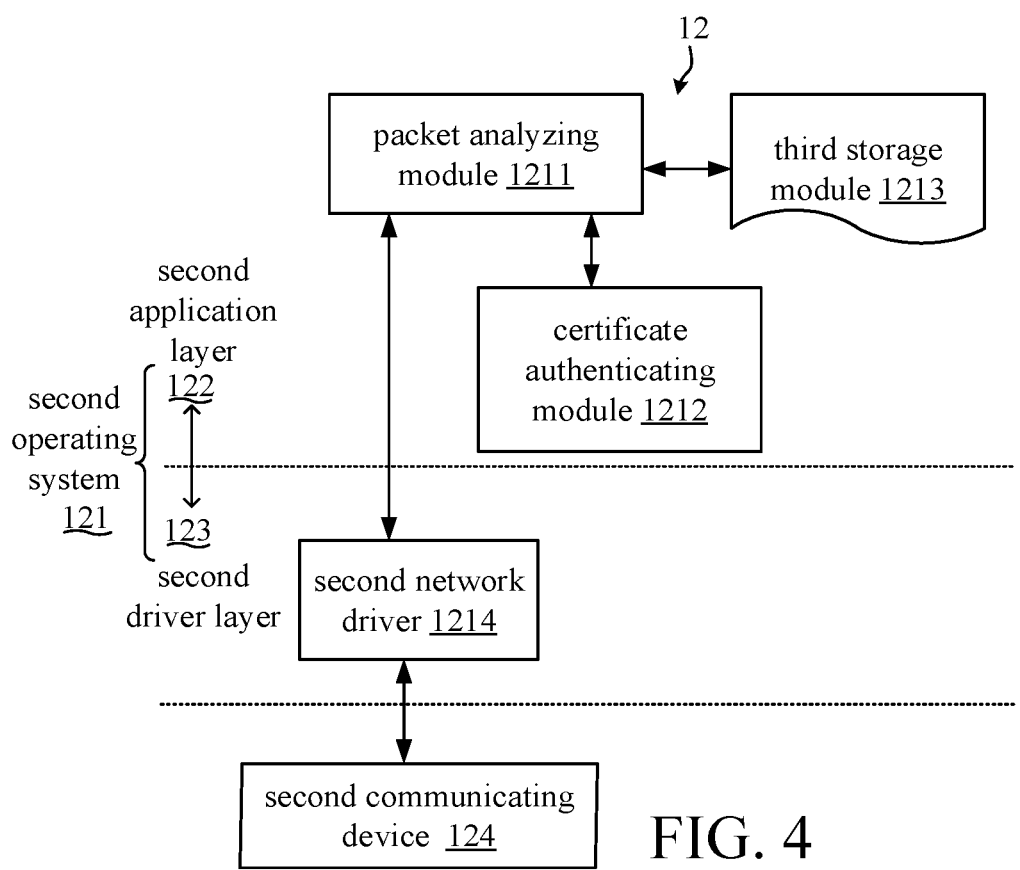
FIG. 4 is a schematic diagram of the architecture of a secure channel server of the system according to the preferred embodiment of the invention.

Referring to FIG. 1, FIG. 2, FIG. 3 and FIG. 4, those drawings illustrate a system 1 for securing a protected host 2 and an implementation environment architecture of the system 1 according to the preferred embodiment of the invention. FIG. 1 is a schematic diagram of the system 1 for securing the protected host 2 and an implementation environment architecture of the system 1 according to the preferred embodiment of the invention. FIG. 2 is a functional block diagram of the system 1 shown in FIG. 1. FIG. 3 is a schematic diagram of the architecture of a terminal data processing apparatus 10 of the system 1 according to the preferred embodiment of the invention. FIG. 4 is a schematic diagram of the architecture of a secure channel server 12 of the system 1 according to the preferred embodiment of the invention.

As shown in FIG. 1, FIG. 2, FIG. 3 and FIG. 4, the system 1, according to the preferred embodiment of the invention, for securing the protected host 2 includes the terminal data processing apparatus 10 and the secure channel server 12.

In one embodiment, the terminal data processing apparatus 10 according to the invention can be various personal data processing system, such as a notebook computer, a desktop computer, a tablet PC, a smart phones, and so on. The terminal data processing apparatus 10 according to the invention can also be a server.

The terminal data processing apparatus 10 includes a first communicating device 104 and at least one first processor 100. The at least one first processor 100 is electrically connected to the first communicating device 104, and functions in executing a first operating system 101.

As shown in FIG. 3, the first operating system 101 includes an authentication module 1011, a secure process launcher 1012, a network filtering module 1013, a secure process authenticating module 1014, a first storage module 1015, a packet encrypting module 1016, a second storage module 1017, and a first network driver 1018. The secure process launcher 1012 is coupled to the authentication module 1011. The network filtering module 1013 is coupled to the secure process launcher 1012. The secure process authenticating module 1014 is coupled to the network filtering module 1013. The first storage module 1015 is coupled to the secure process authenticating module 1014, and therein stores a plurality of verification rules, a plurality of first characteristics and a plurality of first redirection rules. Each verification rule corresponds to at least one of the plurality of first characteristics. The packet encrypting module 1016 is coupled to the network filtering module 1013.

The second storage module 1017 is coupled to the packet encrypting module 1016. The first network driver 1018 is respectively coupled to the network filtering module 1013 and the first communicating device 104.

In one embodiment, the first operating system 101 has a first application layer 102 and a first driver layer 103. The authentication module 1011 and the secure process launcher 1012 can reside in the first application layer 102 of the first operating system 101. The network filtering module 1013, the secure process authenticating module 1014, the first storage module 1015, the packet encrypting module 1016, the second storage module 1017, and the first network driver 1018 can reside in the first driver layer 103 of the first operating system 101.

The secure channel server 12 links to the terminal data processing apparatus 10 via a first network 3. The secure channel server 12 links to the protected host 2 via a second network 4.

The secure channel server 12 includes a second communicating device 124 and at least one second processor 120. The at least one second processor 120 is electrically connected to the second communicating device 124, and functions in executing a second operating system 121.

As shown in FIG. 4, the second operating system 121 includes a second network driver 1214, a packet analyzing module 1211, a certificate authenticating module 1212, and a third storage module 1213. The second network driver 1214 is coupled to the second communicating device 124. The packet analyzing module 1211 is coupled to the second network driver 1214. The certificate authenticating module 1212 is coupled to the packet analyzing module 1211. The certificate authenticating module 1212 issues a certificate, e.g., an X.509 certificate, a JA3 certificate and so on. The certificate is previously stored in the second storage module 1017. The third storage module 1213 is coupled to the packet analyzing module 1211, and therein stores a plurality of second redirection rules.

The authentication module 1011 receives and authenticates at least one authentication data. If an authentication result authenticated by the authentication module 1011 according to the at least one authentication data is positive, the secure process launcher 1012 is executed.

The user 6 who logs into the terminal data processing apparatus 10 must pass through the authentication of the authentication module 1011 again. The authentication mechanism adopted may be a multi-factor authentication way including an account password, a one-time password, and even a fingerprint identification and so on. The security process launcher 1012 must pass the identity authentication of the authentication module 1011 before the security process launcher 1012 can be executed. After the security process launcher 1012 is executed, other security programs that have been set can be executed by using the graphical user interface provided by the security process launcher 1012.

When the secure process launcher 1012 is executed and the at least one first processor 100 executes an application process 106 to link to the secure channel server 12, the application process 106 is coupled to the network filtering module 1013. The network filtering module 1013 retrieves N second characteristics relative to the application process 106, where N is a natural number. The secure process authenticating module 1014 judges whether the application process 106 is a secure process according to the plurality of verification rules, the plurality of first characteristics and the N second characteristics.

If the judgment result of the secure process authenticating module 1014 is positive, the secure process authenticating module 1014 selects a selected first redirection rule corresponding to the application process 106 from the plurality of first redirection rules. The network packet encrypting module 1016 with the certificate encrypts a plurality of first packets relative to the application process 106 into a plurality of encrypted first packets. The network filtering module 1013, according to the selected first redirection rule, redirects the plurality of encrypted first packets to the second communicating device 124 via the first network driver 1018, the first communicating device 104 and the first network 3.

In one embodiment, each verification rule can include at least one characteristic item among an original file name, a signature, an issuer company, a product name, a parent process, a file size, a file version and sum check, or can also include other characteristic items. Various application processes 106, such as trusted window file managers, untrusted ransomwares, etc., all have their own characteristics. With these characteristics, they can be used to strengthen the judgment of the application process 106 to distinguish a trusted secure process from malicious software.

After a process is started, another process can be started. The previously started process is called a parent process, and the later started process is called a child process. The above-mentioned secure process launcher 1012 has been started, and then the application process 106 is started, so the safety program launcher 1012 is a parent process, and application process 106 is a child process.

In one example, the verification rules include characteristic item 1: product name, characteristic item 2: signature, and characteristic item 3: parent program. One case of the verification rule used to determine a secure process includes characteristic item 1=Microsoft Word, characteristic item 2=Microsoft and characteristic item 3=secure process launcher. Another case of the validation rule used to determine a secure process includes characteristic item 1=Microsoft Excel, characteristic item 2=Microsoft and characteristic item 3=secure process launcher. Thereby, it is impossible for a process executed by malicious software to be judged as a secure process.

In one embodiment, each first redirection rule can include a process type, a destination IP address, a destination port, a first redirection IP address, a first redirection port, an encryption type, and the like.

In the TCP/IP protocol (Transmission Control Protocol/Internet Protocol), each service in equipment can be distinguished by "port", which represents which service the packets should be transmitted to for processing. For example, in currently commonly used web server protocol, "http" uses port 80, and "https" uses port 443.

Referring to Table 1, Table 1 lists the first redirection rules of some examples set for a secure process and the first redirection rules set for a general process in accordance with the invention.

In Table 1, the destination IP address and the redirection IP address both are 192.168.3.10, which is the designated IP address of the secure channel server 12.

TABLE 1

| process type | destination IP address | destination port | redirection IP address | redirection port | encryption type |
|---|---|---|---|---|---|
| secure process | 192.168.3.10 | 445 | 192.168.3.10 | 20001 | Yes |
| secure process | 192.168.3.10 | 443 | 192.168.3.10 | 20002 | Yes |

TABLE 1-continued

| process type | destination IP address | destination port | redirection IP address | redirection port | encryption type |
|---|---|---|---|---|---|
| general process | 192.168.3.10 | 445 | 192.168.3.10 | 20003 | No |
| general process | 192.168.3.10 | 443 | 192.168.3.10 | 20004 | No |

The packet analyzing module 1211 receives a plurality of second packets transmitted over the first network 3 through the second communicating device 124 and the second network driver 1214. The plurality of second packets include the plurality of encrypted first packets encrypted by the terminal data processing apparatus 10 with the certificate issued by the secure channel server 12.

The packet analyzing module 1211 analyzes the plurality of second packets to obtain an analysis information. The certificate authenticating module 1212 selectively with the certificate decrypts the plurality of second packets into a plurality of decrypted second packets according to the analysis information. The packet analyzing module 1211 selects a selected second redirection rule from the plurality of second redirection rules according to the analysis information. The packet analyzing module 1211, according to the selected second redirection rule, selectively redirects the plurality of decrypted second packets or the plurality of second packets to the protected host 2 via the second network driver 1214, the second communicating device 124 and the second network 4.

In one embodiment, the second operating system 121 has a second application layer 122 and a second driver layer 123. The packet analyzing module 1211, the certificate authenticating module 1212 and the third storage module 1213 can reside in the second application layer 122 of the second operating system 121. The second network driver 1214 can reside in the second driver layer 123 of the second operating system 121.

In one embodiment, each second redirection rule can include a packet encryption type, a source IP address, a receiving port, a second redirection IP address, a second redirection port, and the like.

Also as shown in FIG. 1, FIG. 2, FIG. 3 and FIG. 4, the system 1, according to the preferred embodiment of the invention, for securing the protected host 2 also includes a honeypot 14. The honeypot 14 links to the secure channel server 12 via a third network 5. The packet analyzing module 1211, according to the selected second redirection rule, alternatively redirects the plurality of decrypted second packets or the plurality of second packets to the protected host 2 via the second network driver 1214, the second communicating device 124 and the second network 4, or to the honeypot 14 via the second network driver 1214, the second communicating device 124 and the third network 5.

Referring to Table 2, Table 2 lists the second redirection rules of se examples set for the plurality of second packets received by the secure channel server 12 in accordance with the invention.

In Table 2, the source IP address of 192.168.3.3 refers to the IP address designated by the terminal data processing apparatus 10. The redirection IP address of 192.168.3.20 refers to the IP address designated by the secure channel server 12. The redirected IP address of 192.168.3.30 refers to the IP address designated by the honeypot 14. It should be emphasized that the IP address of the protected host 2 is not exposed on the network and will not be scanned by attackers. The examples listed in Table 2 show that the encrypted packets, specific source IP address, and specific receiving port are required to redirect the decrypted packets to the protected host 2. In Table 2, the so-called encrypted packets must be those encrypted packets that the certificate verification module 1212 can decrypt with the certificate. Moreover, those packets that the certificate verification module 1212 cannot decrypt with the certificate are regarded as normal packets. Thereby, the protected host 2 can be effectively protected. The attacker must be lured to link to the honeypot 14.

TABLE 2

| encrypted packet type | source IP address | receiving port | redirection IP address | redirection port |
|---|---|---|---|---|
| encrypted packets | 192.168.3.3 | 20001 | 192.168.3.20 | 445 |
| encrypted packets | 192.168.3.3 | 20002 | 192.168.3.20 | 443 |
| normal packets | any IP address | 445 | 192.168.3.30 | 445 |
| normal packets | any IP address | 443 | 192.168.3.30 | 443 |

Obviously, all packets not transmitted from a specific source IP address (for example, the IP address of the terminal data processing apparatus 10) will be redirected to the honeypot 14 by the secure channel server 12. However, it must be considered that the terminal data processing apparatus 10 may still be invaded by an attacker. Therefore, in addition to the need for identity authentication and secure process judgment at the terminal data processing apparatus 10 and encryption of the packet with the certificate issued by the secure channel server 12, the source IP address, the receiving port and the packet encryption are judged, so that the packets transmitted by the attacker from all terminal data processing apparatuses are all redirected to the honeypot 14.

Figure 5:
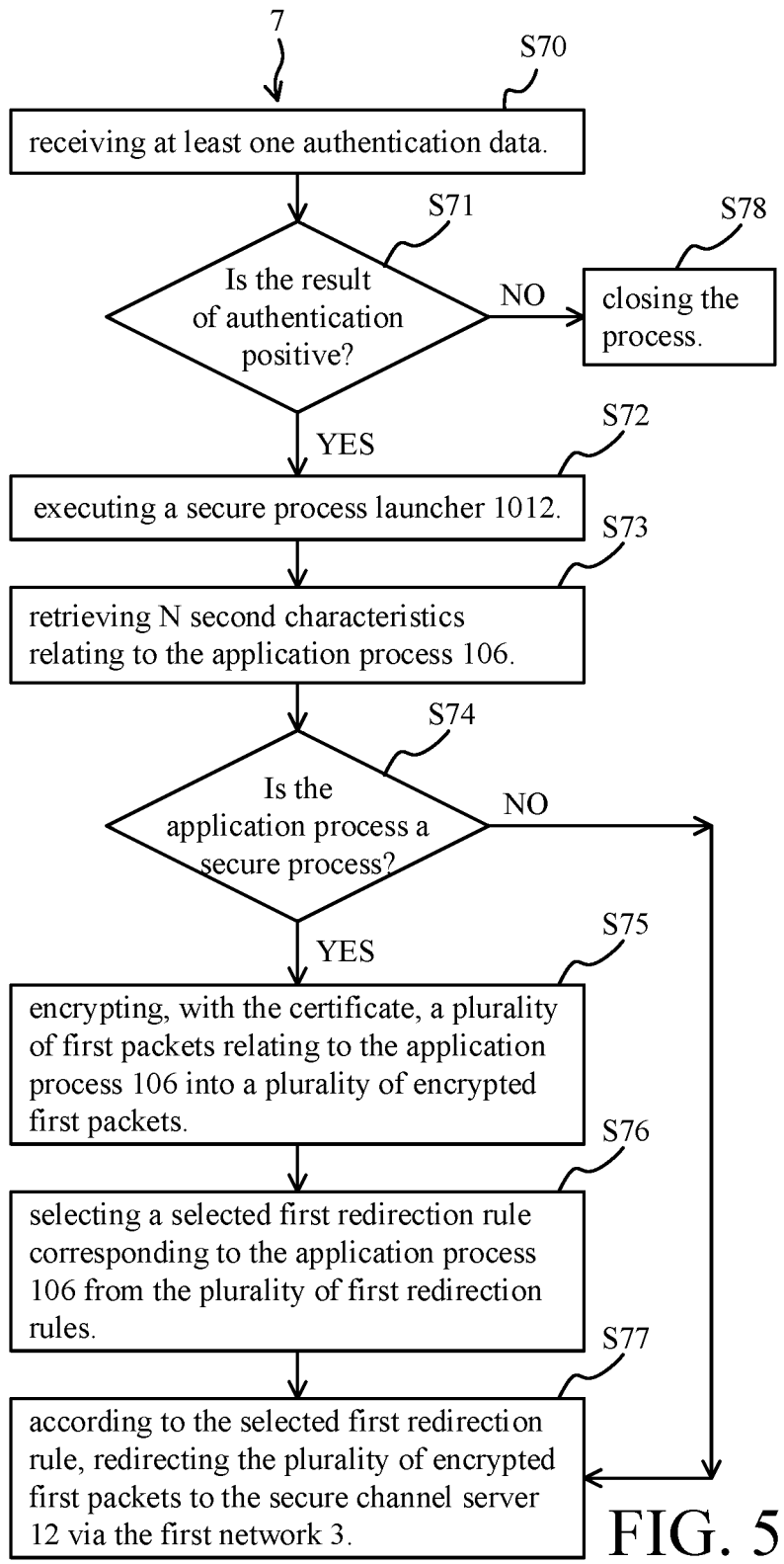
FIG. 5 is a flowchart illustrating a method, according to the preferred embodiment of the invention, for securing the protected host at the terminal data processing apparatus.
Figure 6:
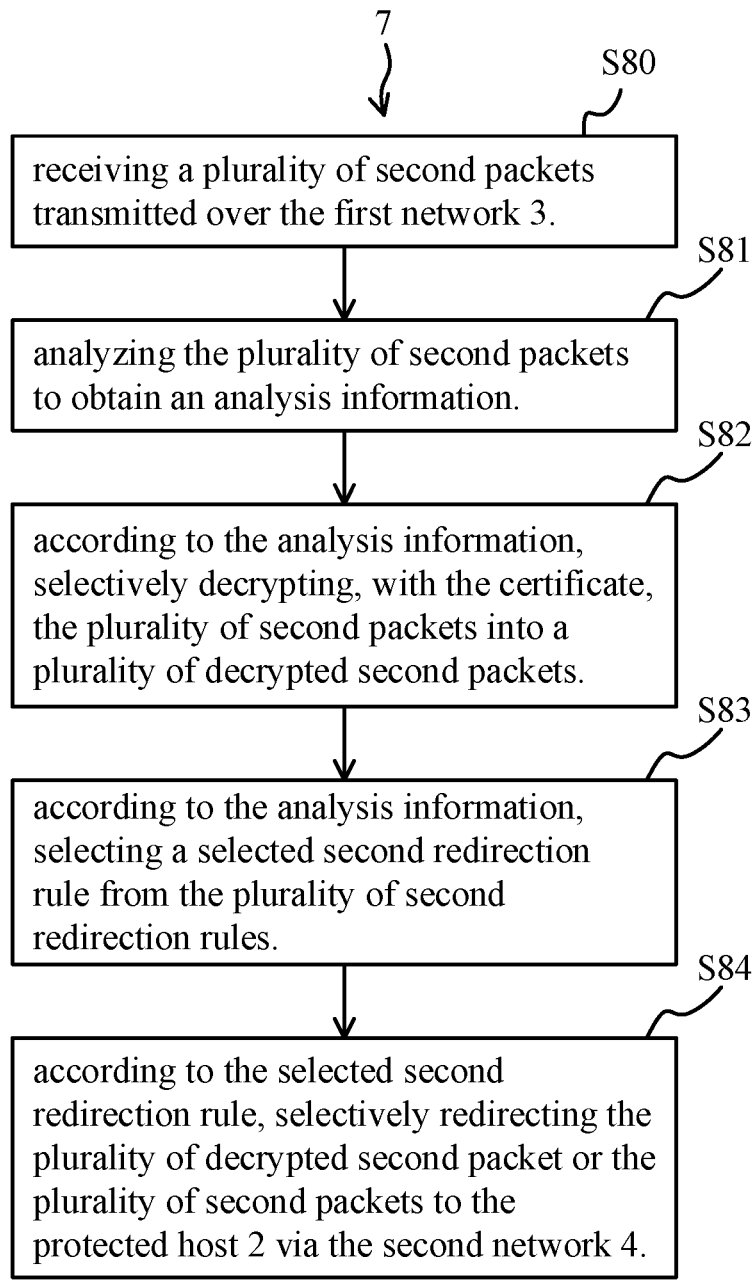
FIG. 6 is a flowchart illustrating a method, according to the preferred embodiment of the invention, for securing the protected host at the secure channel server.

Referring to FIG. 5 and FIG. 6, FIG. 5 and FIG. 6 are the flowcharts illustrating a method 7, according to the preferred embodiment of the invention, for securing the protected host 2.

The implementation environment of method 7 according to the invention is referred to the implementation architecture diagram shown in FIG. 1, the functional block diagram of the system 1, according to the invention, for securing the protected host 2 shown in FIG. 2, the schematic diagram of the architecture of the terminal data processing apparatus 10 of the system 1 according to the invention, and the schematic diagram of the architecture of the secure channel server 12 of the system 1 according to the invention.

As shown in FIG. 2 and FIG. 2, the method 7, according to a preferred embodiment of the invention, is for securing a protected host 2. The implementation environment of the method 7 according to the invention is that the terminal data processing apparatus 10 links to the secure channel server 12 via the first network 3. The secure channel server 12 links to the protected host 2 via a second network 4. The secure channel server 12 issues a certificate. The certificate, a plurality of verification rules, a plurality of first characteristics and a plurality of first redirection rules are previously stored in the terminal data processing apparatus 10. A plurality of second redirection rules are previously stored in the secure channel server 12.

As shown in FIG. 5, the method 7 according to the invention performs, at the terminal data processing apparatus 10, the steps of: performing step S70 to receive at least one authentication data; performing step S71, according to the at least one authentication data, to perform an authentication; performing step S72, if the authentication result is positive, to execute a secure process launcher 1012; performing step S73, when the secure process launcher 1012 is executed and an application process 106 is executed to link to the secure channel server 12, to retrieve N second characteristics relative to the application process 106, where N is a natural number; performing step S74, according to the plurality of verification rules, the plurality of first characteristics and the N second characteristics, to judge if the application process 106 is a secure process; performing step S75, if the application process 106 is judged as the secure process, to encrypt, with the certificate, a plurality of first packets relative to the application process 106 into a plurality of encrypted first packets; performing step S76, to select a selected first redirection rule corresponding to the application process 106 from the plurality of first redirection rules; and performing step S77, according to the selected first redirection rule, redirecting the plurality of encrypted first packets to the secure channel server 12 via the first network 3. If the authentication result is negative, the method 7 according to the invention performs step S78 to close the process. If the application process 106 is judged as an untrusted process, the method 7 according to the invention performs step S77.

In one embodiment, each verification rule can include at least one characteristic item among an original file name, a signature, an issuer company, a product name, a parent process, a file size, a file version and sum check, or can also include other characteristic items.

In one embodiment, each first redirection rule can include a process type, a destination IP address, a destination port, a first redirection IP address, a first redirection port, an encryption type, and the like.

As shown in FIG. 6, the method 7 according to the invention performs, at the secure channel server 12, the steps of: performing step S80 to receive a plurality of second packets transmitted over the first network 3; performing step S81 to analyze the plurality of second packets to obtain an analysis information; performing step S82, according to the analysis information, to selectively decrypt, with the certificate, the plurality of second packets into a plurality of decrypted second packets; performing step S83, according to the analysis information, to select a selected second redirection rule from the plurality of second redirection rules; and performing step S814, according to the selected second redirection rule, to selectively redirect the plurality of decrypted second packets or the plurality of second packets to the protected host 2 via the second network 4.

In one embodiment, each second redirection rule can include a packet encryption type, a source IP address, a receiving port, a second redirection IP address, a second redirection port, and the like.

Also as shown in FIG. 1 and FIG. 2, the implementation environment of the method 7, according to the preferred embodiment of the invention, for securing the protected host 2 also is that the secure channel server 12 links to a honeypot 14 via a third network 5. The method 7 according to the invention finally performs step S84, at the secure channel server 12, according to the selected second redirection rule, to alternatively redirect the plurality of decrypted second packets or the plurality of second packets to the protected host 2 via the second network 4, or to the honeypot 14 via the third network 5.

It should be emphasized that the steps of the method 7 according to the invention executed at the terminal data processing apparatus 10 and the steps of the method 7 according to the invention executed at the secure channel server 12 have no priority, but are executed in parallel. In this way, it can effectively prevent the attacker from linking to the protected host 2 and being trapped to link to the honeypot 14.

With the detailed description of the above preferred embodiments of the invention, it is clear to understand that by the system and the method according to the invention, the protected host can not only be effectively protected, but also the IP address of the protected host is not exposed on the network. Moreover, there is no need to set up a large number of honeypots. The attacker must be lured to link to the honeypot.

With the example and explanations above, the characteristics and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system for securing a protected host, comprising:
a terminal data processing apparatus, comprising:
a first communicating device; and
at least one first processor, being electrically connected to the first communicating device and functioning in executing a first operating system, the first operating system comprising:
an authentication module;
a secure process launcher, coupled to the authentication module;
a network filtering module, coupled to the secure process launcher;
a secure process authenticating module, coupled to the network filtering module;
a first storage module, being coupled to the secure process authenticating module and therein storing a plurality of verification rules, a plurality of first characteristics and a plurality of first redirection rules, wherein each verification rule corresponds to at least one of the plurality of first characteristics;
a packet encrypting module, coupled to the network filtering module;
a second storage module, coupled to the packet encrypting module; and
a first network driver, respectively coupled to the network filtering module and the first communicating device; and
a secure channel server, linking to the terminal data processing apparatus via a first network and linking to the protected host via a second network, the secure channel server comprising:
a second communicating device; and
at least one second processor, being electrically connected to the second communicating device and functioning in executing a second operating system, the second operating system comprising:
a second network driver, coupled to the second communicating device;
a packet analyzing module, coupled to the second network driver;
a certificate authenticating module, being coupled to the packet analyzing module and issuing a certificate, wherein the certificate is previously stored in the second storage module; and
a third storage module, being coupled to the packet analyzing module and therein storing a plurality of second redirection rules;

wherein the authentication module receives and authenticates at least one authentication data, if an authentication result authenticated by the authentication module according to the at least one authentication data is positive, the secure process launcher is executed,
when the secure process launcher is executed and the at least one first processor executes an application process to link to the secure channel server, the application process is coupled to the network filtering module,
the network filtering module retrieves N second characteristics relative to the application process, N is a natural number,
the secure process authenticating module judges whether the application process is a secure process according to the plurality of verification rules, the plurality of first characteristics and the N second characteristics, if the judgment result of the secure process authenticating module is positive, the secure process authenticating module selects a selected first redirection rule corresponding to the application process from the plurality of first redirection rules, and the network packet encrypting module with the certificate encrypts a plurality of first packets relative to the application process into a plurality of encrypted first packets,
the network filtering module, according to the selected first redirection rule, redirects the plurality of encrypted first packets to the second communicating device via the first network driver, the first communicating device and the first network,
the packet analyzing module receives a plurality of second packets transmitted over the first network through the second communicating device and the second network driver,
the packet analyzing module analyzes the plurality of second packets to obtain an analysis information, and the certificate authenticating module selectively with the certificate decrypts the plurality of second packets into a plurality of decrypted second packets according to the analysis information, the packet analyzing module selects a selected second redirection rule from the plurality of second redirection rules according to the analysis information, the packet analyzing module, according to the selected second redirection rule, selectively redirects the plurality of decrypted second packets or the plurality of second packets to the protected host via the second network driver, the second communicating device and the second network.

2. The system of claim 1, further comprising:
a honeypot, linking to the secure channel server via a third network, wherein the packet analyzing module, according to the selected second redirection rule, alternatively redirects the plurality of decrypted second packets or the plurality of second packets to the protected host via the second network driver, the second communicating device and the second network, or to the honeypot via the second network driver, the second communicating device and the third network.

3. The system of claim 2, wherein each verification rule comprises at least one selected from the group consisting of an original file name, a signature, an issuer company, a product name, a parent process, a file size, a file version, and a s check sum.

4. The system of claim 3, wherein the first operating system has a first application layer and a first driver layer, the authentication module and the secure process launcher reside in the first application layer, the network filtering module, the secure process authenticating module, the first storage module, the packet encrypting module, the second storage module, and the first network driver reside in the first driver layer.

5. The system of claim 4, wherein the second operating system has a second application layer and a second driver layer, the packet analyzing module, the certificate authenticating module and the third storage module reside in the second application layer, the second network driver resides in the second driver layer.

6. The system of claim 5, wherein each first redirection rule comprises a process type, a destination Internet Protocol (IP) address, a destination port, a first redirection IP address, a first redirection port, and an encryption type, and each second redirection rule comprises a packet encryption type, a source IP address, a receiving port, a second redirection IP address and a second redirection port.

7. A method for securing a protected host, wherein a terminal data processing apparatus links to a secure channel server via a first network, the secure channel server links to the protected host via a second network, the secure channel server issues a certificate, the certificate, a plurality of verification rules, a plurality of first characteristics and a plurality of first redirection rules are previously stored in the terminal data processing apparatus, a plurality of second redirection rules are previously stored in the secure channel server, said method comprising the steps of:

at the terminal data processing apparatus, performing the steps of:

(a1) receiving at least one authentication data; and (a2) according to the at least one authentication data, performing an authentication;

(a3) if YES in step (a2), executing a secure process launcher;

(a4) when the secure process launcher is executed and an application process is executed to link to the secure channel server, retrieving N second characteristics relative to the application process, wherein N is a natural number;

(a5) according to the plurality of verification rules, the plurality of first characteristics and the N second characteristics, judging if the application process is a secure process;

(a6) if YES in step (a5), encrypting, with the certificate, a plurality of first packets relative to the application process into a plurality of encrypted first packets;

(a7) selecting a selected first redirection rule corresponding to the application process from the plurality of first redirection rules; and (a8) according to the selected first redirection rule, redirecting the plurality of encrypted first packets to the secure channel server via the first network; and at the secure channel server, performing the steps of:

(b1) receiving a plurality of second packets transmitted over the first network;

(b2) analyzing the plurality of second packets to obtain an analysis information;

(b3) according to the analysis information, selectively decrypting, with the certificate, the plurality of second packets into a plurality of decrypted second packets;

(b4) according to the analysis information, selecting a selected second redirection rule from the plurality of second redirection rules; and (b5) according to the selected second redirection rule, selectively redirecting the plurality of decrypted second packets or the plurality of second packets to the protected host via the second network.

8. The method of claim 7, wherein the secure channel server links to a honeypot via a third network, step (b5) is performed by the step of:

according to the selected second redirection rule, alternatively redirecting the plurality of decrypted second packets or the plurality of second packets to the protected host via the second network, or to the honeypot via the third network.

9. The method of claim 8, wherein each verification rule comprises at least one selected from the group consisting of an original file name, a signature, an issuer company, a product name, a parent process, a file size, a file version, and a s check sum.

10. The method of claim 9, wherein each first redirection rule comprises a process type, a destination Internet Protocol (IP) address, a destination port, a first redirection IP address, a first redirection port, and an encryption type, and each second redirection rule comprises a packet encryption type, a source IP address, a receiving port, a second redirection IP address and a second redirection port.

* * * * *